US009183289B2

(12) United States Patent
Pulfer et al.

(10) Patent No.: US 9,183,289 B2
(45) Date of Patent: *Nov. 10, 2015

(54) DOCUMENT CLASSIFICATION TOOLBAR IN A DOCUMENT CREATION APPLICATION

(75) Inventors: Charles E. Pulfer, Ottawa (CA); Brad P. Smith, Merrickville (CA); Tim J. Upton, Ottawa (CA)

(73) Assignee: TITUS, INC. (CA)

( * ) Notice: Subject to any disclaimer, the term of this patent is extended or adjusted under 35 U.S.C. 154(b) by 20 days.

This patent is subject to a terminal disclaimer.

(21) Appl. No.: 13/236,374

(22) Filed: Sep. 19, 2011

(65) Prior Publication Data

US 2012/0023075 A1   Jan. 26, 2012

Related U.S. Application Data

(63) Continuation of application No. 11/877,616, filed on Oct. 23, 2007, now Pat. No. 8,024,304.

(60) Provisional application No. 60/863,067, filed on Oct. 26, 2006.

(51) Int. Cl.
*G06F 17/30* (2006.01)

(52) U.S. Cl.
CPC ............................... *G06F 17/30722* (2013.01)

(58) Field of Classification Search
None
See application file for complete search history.

(56) References Cited

U.S. PATENT DOCUMENTS

| 5,958,005 | A | 9/1999 | Thorne et al. ................. 709/202 |
| 5,991,709 | A | 11/1999 | Schoen | |
| 6,591,367 | B1 | 7/2003 | Kobata et al. ................. 713/201 |
| 6,836,846 | B1 | 12/2004 | Kanevsky et al. ............ 713/193 |
| 6,986,049 | B2 | 1/2006 | Delany .......................... 713/176 |
| 7,020,654 | B1 * | 3/2006 | Najmi ..................................... 1/1 |
| 7,110,983 | B2 | 9/2006 | Shear et al. | |
| 8,024,304 | B2 | 9/2011 | Pulfer et al. .................. 707/694 |
| 8,024,411 | B2 | 9/2011 | Pulfer et al. .................. 709/206 |

(Continued)

FOREIGN PATENT DOCUMENTS

| AU | 2003202436 | 3/2003 | ............. G06F 17/60 |
| WO | WO02/059867 | 8/2002 | ............. G09G 5/00 |

OTHER PUBLICATIONS

Morrison, Geoff, "Implementation Guide for Email Protective Markings for Australian Government Agencies", Oct. 1, 2005 pp. ii-45, Department of Finance and Administration for Australian Government Information Management Office.

(Continued)

*Primary Examiner* — Tony Mahmoudi
*Assistant Examiner* — Tuan-Khanh Phan
(74) *Attorney, Agent, or Firm* — Hayes Soloway P.C.

(57) ABSTRACT

A toolbar in a document creation application provides the ability to classify documents based on specific properties such as security classification. The toolbar through dropdown selections allows users to select the appropriate classification and properties based upon the content of the document and have appropriate classifiers added to the document. Document classification properties are generated that are associated with the document in the document properties and by inserting visual markings that allow users to quickly identify the security, sensitivity, intended distribution or retention. By utilizing the classification toolbar a user can classify an document by one or more classification levels and be ensured that the classification will be visible to any person viewing the document.

38 Claims, 13 Drawing Sheets

(56) References Cited

U.S. PATENT DOCUMENTS

| | | | |
|---|---|---|---|
| 8,561,127 B1* | 10/2013 | Agrawal et al. | 726/1 |
| 2003/0182583 A1 | 9/2003 | Turco | 713/201 |
| 2003/0236845 A1 | 12/2003 | Pitsos | 709/206 |
| 2005/0044066 A1 | 2/2005 | Hooper et al. | 707/3 |
| 2005/0060643 A1 | 3/2005 | Glass et al. | 715/501.1 |
| 2005/0138079 A1 | 6/2005 | Liu et al. | 707/104.1 |
| 2005/0144245 A1* | 6/2005 | Lowe | 709/206 |
| 2006/0041605 A1* | 2/2006 | King et al. | 707/205 |
| 2006/0053490 A1* | 3/2006 | Herz et al. | 726/23 |
| 2006/0075228 A1 | 4/2006 | Black et al. | 713/167 |
| 2006/0085469 A1 | 4/2006 | Pfeiffer et al. | 707/102 |

OTHER PUBLICATIONS

"Australian Government Email Metadata Standard (AGEMS), Version 1.0", National Archives of Australia, Dec. 2005. pp. 4-18.

Wyatt, Anthony, "Protective Markings in Email, Email Client Behaviour Specification", Australian Government, Department of Finance and Administration, Nov. 21, 2005, pp. 1-18.

Jones, et al., "Email Protective Marking Standard for the Australian Government", Australian Government, Department of Finance and Administration, Oct. 2005, pp. 1-34.

"Classift for Outlook; Key Features", (http://www.markwilson.ca/outlook.html; http://www.markwilson.ca/read-me.html; and http://www.markwilson.ca/oshot.html) May 23, 2005, 8 pgs.

"What is a COM Add-in?" and "Hooking a COM Add-in Up to a Command Bar Control" (http://msdn.microsoft.com/en-us/library/aa190119(office.10,printer).aspx and http://msdn.microsoft.com/en-us/library/aa165301(office.10,printer).aspx, Microsoft Corporation/Visual Basic Programmer's Guide, published prior or during 2000, 3 pgs.

"Adobe Streamlines Workflows for Publishers with New Metadata Technology", Adobe Press Room, Sep. 24, 2001, 3 pgs.

"Titus Labs Document Classification V1.1" published Nov. 3, 2005, http://webarchive.org/web/20060104112621/www.titus-labs.com/includes/PDF/DocClassDatasheet.pdf.

"Titus Labs Announces Document Classification for Microsoft Word", published Nov. 3, 2005, http://web.archive.org/web/20051126093136/http://www.titus-labs.com/about/DocClassRelease.html.

Request for Ex Parte Reexamination including 34 exhibits in four groups, filed in U.S. Pat. No. 8,024,304, dated Sep. 13, 2012. (Citation correction--document previously submitted with IDS dated Sep. 19, 2012).

Request for Ex Parte Reexamination, Replacement Statement and Explanation-37CFR 1.510(b)(1) & (2) filed in U.S. Pat. No. 8,024,304 on Dec. 3, 2012.

James Turner and Robert Turner, U.S. Pat. No. 7,958,147 B1, issued Jun. 7, 2011, Washington, D.C. (Exhibit Pt-2) (document previously submitted with IDS dated Sep. 19, 2012).

James Turner, Digitaltide Solutions Inc. website, www.digitaltidesolutions.com, Oct. 2005, 8 pages, Malvern, PA (Exhibit WS-1) (document previously submitted with IDS dated Sep. 19, 2012).

James Turner, Digitaltide Solutions Inc. website, www.digitaltidesolutions.com, May 2006, 18 pages, Malvern, PA (Exhibit WS-2) (document previously submitted with IDS dated Sep. 19, 2012).

James Turner, Digitaltide Solutions Inc. website, www.digitaltidesolutions.com, Jun. 2006, 51 pages, Malvern, PA (Exhibit WS-3) (document previously submitted with IDS dated Sep. 19, 2012).

Robert Turner, Digitaltide Solutions Product Demonstration, Oct. 22, 2005, 42 pages, Washington, DC (Exhibit MP-1) (document previously submitted with IDS dated Sep. 19, 2012).

Robert Turner, Digitaltide Solutions Product Demonstration, Jan. 30, 2006, 53 pages, Washington, DC (Exhibit MP-3) (document previously submitted with IDS dated Sep. 19, 2012).

Robert Turner, Prepared Handouts of Digitaltide Solutions Product Overview, Apr. 27, 2006, 3 pages, Charleston, SC (Exhibit MP-9) (document previously submitted with IDS dated Sep. 19, 2012).

Robert Turner, Digitaltide Solutions Introduces ClassMarker Suite 1.0, Oct. 22, 2005, 5 pages, Washington, DC(Exhibit MP-10) (document previously submitted with IDS dated Sep. 19, 2012).

James Turner, CM-Suite "Document Security In-Depth" Version 1.0, Released Jan. 11, 2006, 5 pages, Malvern, PA (Exhibit MP-12) (document previously submitted with IDS dated Sep. 19, 2012).

James Turner, Dear Security/Network Professional, Apr. 13, 2006, 1 page, Malvern, PA (Exhibit MP-13) (document previously submitted with IDS dated Sep. 19, 2012).

Request for Ex Parte Reexamination including 34 exhibits in four groups, filed in U.S. Appl. No. 13/236,374 on Sep. 14, 2012.

* cited by examiner

```xml
<?xml version="1.0" encoding="UTF-8" standalone="yes" ?>
<Properties xmlns="http://schemas.openxmlformats.org/officeDocument/2006/custom-properties"
xmlns:vt="http://schemas.openxmlformats.org/officeDocument/2006/docPropsVTypes" >
    <property fmtid="{D5CDD505-2E9C-101B-9397-08002B2CF9AE}" pid="2" name="TitusGUID" >
        <vt:lpwstr>247b0472-dcbc-4c9c-aa11-fa0506dea7cd</vt:lpwstr>
    </property>
    <property fmtid="{D5CDD505-2E9C-101B-9397-08002B2CF9AE}" pid="3" name="TitusCorpidClassified By" >
        <vt:lpwstr>Captain Smith</vt:lpwstr>
    </property>
    <property fmtid="{D5CDD505-2E9C-101B-9397-08002B2CF9AE}" pid="4" name="aliasHeaderFooterWatermark" >
        <vt:lpwstr>Secret</vt:lpwstr>
    </property>
    <property fmtid="{D5CDD505-2E9C-101B-9397-08002B2CF9AE}" pid="5" name="aliasHeaderFooter" >
        <vt:lpwstr>RelToNATO</vt:lpwstr>
    </property>
    <property fmtid="{D5CDD505-2E9C-101B-9397-08002B2CF9AE}" pid="6" name="TitusCorpClassification" >
        <vt:lpwstr>NONE</vt:lpwstr>
    </property>
    <property fmtid="{D5CDD505-2E9C-101B-9397-08002B2CF9AE}" pid="7" name="TitusCorpidClassification" >
        <vt:lpwstr>Secret</vt:lpwstr>
    </property>
    <property fmtid="{D5CDD505-2E9C-101B-9397-08002B2CF9AE}" pid="8" name="TitusCorpidCaveat" >
        <vt:lpwstr>RelToNATO</vt:lpwstr>
    </property>
    <property fmtid="{D5CDD505-2E9C-101B-9397-08002B2CF9AE}" pid="9" name="TitusCorpidDerived From" >
        <vt:lpwstr>Doc1</vt:lpwstr>
    </property>
    <property fmtid="{D5CDD505-2E9C-101B-9397-08002B2CF9AE}" pid="10" name="TitusCorpDocument Status" >
        <vt:lpwstr>Draft</vt:lpwstr>
    </property>
</Properties>
```

Fig. 12

```xml
<?xml version="1.0" encoding="UTF-8" standalone="yes" ?>
<w:document xmlns:ve="http://schemas.openxmlformats.org/markup-
compatibility/2006" xmlns:o="urn:schemas-microsoft-com:office:office"
xmlns:r="http://schemas.openxmlformats.org/officeDocument/2006/
relationships"
xmlns:m="http://schemas.openxmlformats.org/officeDocument/2006/math"
xmlns:v="urn:schemas-microsoft-com:vml"
xmlns:wp="http://schemas.openxmlformats.org/drawingml/2006/
wordprocessingDrawing" xmlns:w10="urn:schemas-microsoft-com:office:word"
xmlns:w="http://schemas.openxmlformats.org/wordprocessingml/2006/main"
xmlns:wne="http://schemas.microsoft.com/office/word/2006/wordml">
  <w:body>
    <w:p w:rsidR="00BD4E99" w:rsidRDefault="00810FEE" />
    <w:p w:rsidR="004213D8" w:rsidRDefault="004213D8" />
    <w:p w:rsidR="004213D8" w:rsidRDefault="004213D8">
      <w:r>
        <w:t>This is an example document showing document classification.</w:t>
      </w:r>
    </w:p>                                                                    ← 1302
    <w:p w:rsidR="004213D8" w:rsidRDefault="004213D8" />
    <w:customXml w:uri="urn:schemas-tituslabs.com" w:element="Secret">
      <w:customXml w:uri="urn:schemas-tituslabs.com" w:element="RelToUSA_CAN">
        <w:p w:rsidR="004213D8" w:rsidRPr="00301886" w:rsidRDefault="004213D8">
          <w:pPr>
            <w:rPr>
              <w:b />
            </w:rPr>
          </w:pPr>
          <w:r w:rsidRPr="00301886">
            <w:rPr>
              <w:b />
            </w:rPr>                                                          ← 1304
            <w:t xml:space="preserve">This paragraph will be classified.</w:t>
          </w:r>
          <w:r w:rsidR="00F56D26" w:rsidRPr="00301886">
            <w:rPr>
              <w:b />
            </w:rPr>
            <w:t>Its</w:t>
          </w:r>
          <w:r w:rsidRPr="00301886">
            <w:rPr>
              <w:b />
            </w:rPr>
            <w:t xml:space="preserve">classification may be different
from other sentences or paragraphs in the document.</w:t>
```

1300 (top of figure)

*Fig. 13*

DOCUMENT CLASSIFICATION TOOLBAR IN A DOCUMENT CREATION APPLICATION

CROSS-REFERENCE TO RELATED APPLICATIONS

This application is a continuation of U.S. application Ser. No. 11/877,616 filed Oct. 23, 2007, now issued U.S. Pat. No. 8,024,304, which claims priority from U.S. provisional application No. 60/863,067 filed Oct. 26, 2006 the contents of which are hereby incorporated by reference in their entirety.

TECHNICAL FIELD

The present disclosure relates to computer systems and software, and in particular to electronic document management and security using a document classification toolbar.

BACKGROUND

Electronic documents commonly used in the corporate and government environments are generated being word processing applications, spreadsheets, slide presentations, the most common being Microsoft Office™ application suite. With today's pervasive networking systems such as local area networks (LANs), wide area networks (WANs) and the Internet, and software tools such as e-mail, it is very easy for individuals to move these documents around to different computers, computer systems and other individuals without little or no thought as to the sensitivity of the content contained therein. As a matter of security in the electronic workplace there is therefore a need to classify, manage and control the creation and flow of documents, e-mail correspondence and the like.

Some document management solutions allow the user to associate classifications to a document when a document is added to a document management repository governed by document management systems. These classification properties are stored in the document library database and are not actually attached to the document itself and are dependent on the document management system for identification and enforcement.

When a document is removed from the document management repository and sent to or shared with someone, it loses the associated properties because the properties are not part of the document. The classification may not also be visible on any printed copies of the document itself. As a result, the person receiving the document has no easy way to identify the classification of the document, and they therefore do not know what limitations should be placed on the handling and distribution of the document. In addition, compliance systems verifying the handling or distribution of the document have no way to decide what to do with the document as there are no properties attached to the document and potential contained in the document itself.

There is therefore a need for an improved classification and management system for electronic documents.

SUMMARY

In an aspect there is provided a method for document classification in a document creation application comprising providing a security classification toolbar within an extendable mark-up language (XML) based word processing document in the document creation application, the classification toolbar providing a first classification selection input; populating the first security classification selection input in the classification toolbar with a plurality of security classification selections based upon pre-defined security classification criteria, the pre-defined classification criteria defining the plurality of security classification selections available to a user of the document creation application; receiving a first security classification selection input from the plurality of security classification selections, selected by the user, from the first security classification selections populated in the toolbar; applying visual cues associated with the selected first security classification input, the visual cues presented within editable text portions of the document in the document creation application to provide visual indication within the text of the document to identify that the document has been security classified based upon the selected first security classification; and assigning XML security classification properties to the document metadata embedded in the XML based word processing document identifying the first selected security classification input.

In accordance with another aspect there is provided a method for document classification in a document creation application comprising the steps: providing a classification toolbar within the document, the classification toolbar providing at least a first classification selection input; populating classification selections in the classification toolbar based upon pre-defined classification criteria; receiving identification of a selected text portion of the document from a user; receiving a portion classification selection input, selected by the user, from the classification selections populated in the toolbar; determining if portion classification input is valid based upon administrator defined classification policy; applying visual cues to the document to identify a portion of the document has been classified; applying visual markers identifying the selected classification at the beginning and end of the portion that has been classified; and applying XML properties within the document representing the classification of the portions.

In accordance with yet another aspect there is provided a non-transitory computer readable medium containing instructions for providing document classification in a document creation application, the instructions which when executed by a processor for performing providing a security classification toolbar within an extendable mark-up language (XML) based word processing document in the document creation application, the classification toolbar providing a first classification selection input; populating the first security classification selection input in the classification toolbar with a plurality of security classification selections based upon pre-defined security classification criteria, the pre-defined classification criteria defining the plurality of security classification selections available to a user of the document creation application; receiving a first security classification selection input from the plurality of security classification selections, selected by the user, from the first security classification selections populated in the toolbar; applying visual cues associated with the selected first security classification input, the visual cues presented within editable text portions of the document in the document creation application to provide visual indication within the text of the document to identify that the document has been security classified based upon the selected first security classification; and assigning XML security classification properties to the document metadata embedded in the XML based word processing document identifying the first selected security classification input.

Other aspects and features will become apparent to those ordinarily skilled in the art upon review of the following description of specific embodiment of the invention in conjunction with the accompanying figures.

BRIEF DESCRIPTION OF THE DRAWINGS

Further features and advantages will become apparent from the following detailed description, taken in combination with the appended drawings, in which:

FIG. 12 shows XML document classification properties;

FIG. 13 shows a portion of the document of FIG. 5 in XML and the identifying classification and portion marking.

It will be noted that throughout the appended drawings, like features are identified by like reference numerals.

DETAILED DESCRIPTION

Figure 1:
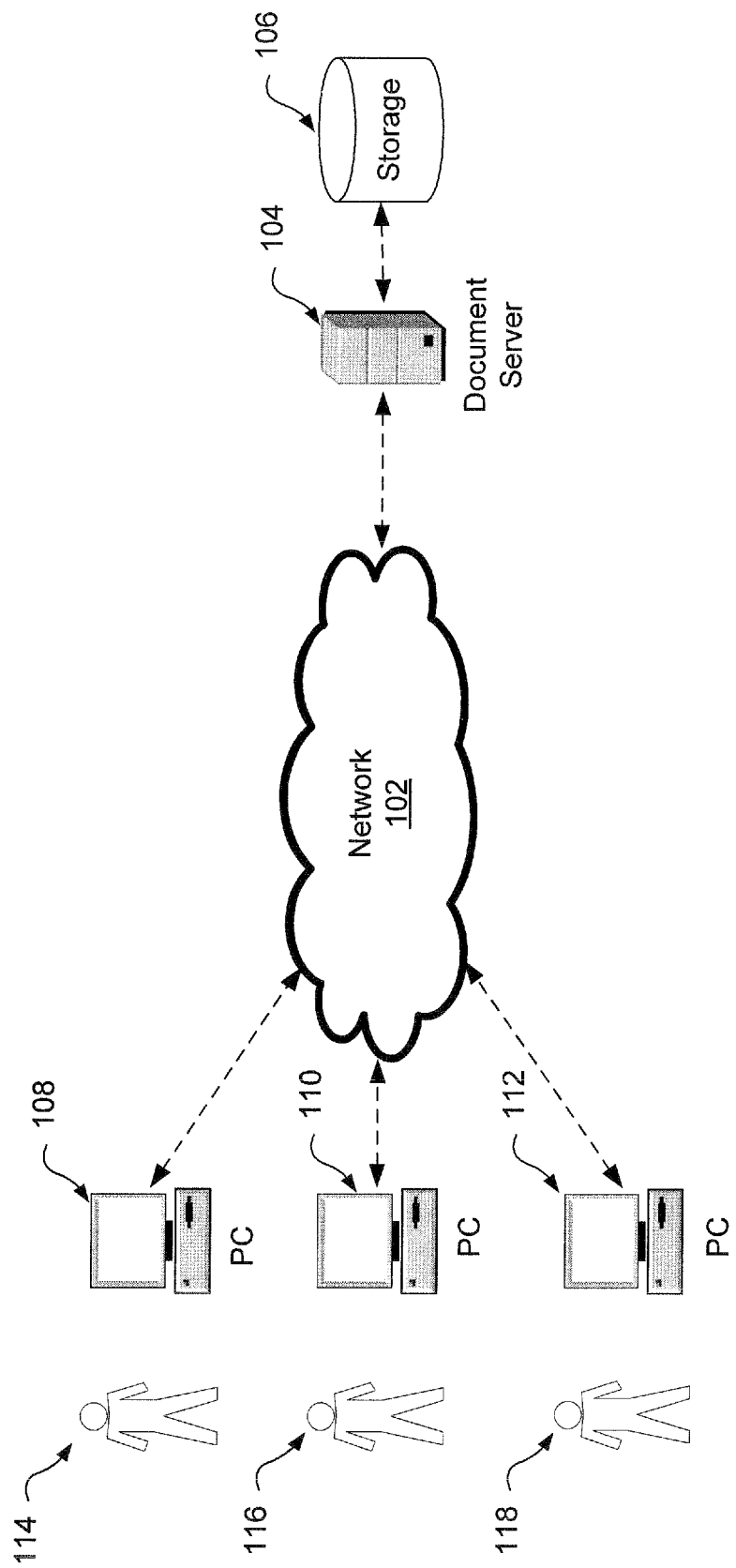
FIG. 1 shows a block diagram of a document classification system architecture.

Embodiments are described below, by way of example only, with reference to FIGS. 1-14.

Due to compliance legislation such as the Sarbanes-Oxley Act in the United States (or more precisely, the Public Company Accounting Reform and Investor Protection Act of 2002), policies such as the Health Insurance Portability and Accountability Act (HIPAA), or other legal or corporate guidelines there is a need for greater security of information. Companies need to be able to determine the classification of documents so that their employees will handle information correctly in terms of privacy, security, distribution and retention. The best way to do this is to generate recognizable classification properties and visual markers in the documents when they are being created so that everyone will know the level of sensitivity of the documents and how to handle them.

By creating classification criteria metadata properties inserted in a document travel with the document and also allow automatic processes to check the handling of the document. For example, a messaging gateway or content scanner can verify the classification of documents being sent out of the company via e-mail for any violations of policy. In addition classification criteria can allow the automatic insertion of to visual cues to identify the associated classification in a standard manner. Heretofore, this cannot be done with productivity suites such as Microsoft™ Office software, Adobe™ Acrobat, OpenOffice™, Corel™ WordPerfect™ Office and Microsoft Visio™. Most document creation applications allow users to add optional properties to the document such as Title, Author, Subject, but cannot force the user to enter any properties before a document is saved or enforce classification standards. The document classification system described herein can force the user to select classification properties to be associated with the document, or portions therein, in addition to providing visual cues inserted within the document in standard format to ensure classification properties are appropriately identified and transmitted. Automatic insertion of visual markings in document including headers and footers in addition to advanced formatting capabilities which allow the user to apply the classification markings to specific areas of the header and footer (left justified, center, right justified etc.) to provide a consistent level of visibility not previously available. Custom properties that are associated with the document travel with the document and reflect the classification of the document can be integrated with rights management systems to limit access and distribution of document based upon the associated classification.

Event driven logic is utilized to force user to classify a documents before saving, sending or printing as described in more detail below. In addition to providing overall document classification, portions of the document can be classified at a different level than the document classification with unique classification markings associated to clearly identify the selected portion. All SAVE, PRINT and SEND events are interpreted within the document productivity software and ensure that classification selections have been made before these actions. Prevention or warning can be displayed when the user attempts to downgrade a classification of a document. In the downgrade prevent mode, if the user tries to downgrade the classification, for example from SECRET to UNCLASSIFIED, they can be prevented based upon the existing properties associated with it. Alternatively the document can be automatically classified based on the users profile. For example, all users in the finance department could be configured to automatically apply a classification of FINANCIAL INFO to all their documents. Visual markings within the document such as header, footer or watermarks can be automatically inserted based upon the selected classification.

Context sensitive classification selections which change based on user selection can also be provided by the toolbar. For example, if the user selects CONFIDENTIAL as a classification they can then be prompted to indicate which department generated the confidential information and how long the information should be retained as a corporate record.

FIG. 1 provides a high level overview environment in which classification toolbars can be utilized. A user selects 114 classifications for a document via toolbar extensions to the office software applications such as Microsoft Word™, Excel™, PowerPoint™ or Adobe Acrobat™, etc. executed by computers 108, 110 and 112 having processors and memory which are operated by users 114, 116 and 118 respectively. The client may be a personal computer, notebook computer or portable computing device such a mobile phone or personal digital assistant (PDA) device. In a networked environment the clients 108, 110, 112 can access a storage or document management server 104 through a network 102 such as the internet. The server 104 can provide access to a storage device 106 containing documents. The storage device 106 may also contain computer readable code required to implement the toolbar on clients 108, 110 and 112. Alternative the computers 108, 110 and 112 may have local storage for documents and computer executable code.

Classification selection enables the automatic creation of properties that will travel with the document and may be enforced by document classification software either residing on the computer 108, 110, or 112, or by a central server 104. Trusted label support provides verification that classification of the document has not been modified (tampered with) which can be done by calculating a hash of the document properties on saving and recalculating the hash on re-opening of the document by the software operating on the client. In addition, the classification policy allows users to search a network or PC for documents with specific classifications. Automatic logging may be provided for all classification actions by the user can be provided which can be used to audit user compliance. For example all classification warnings, classification errors, or all classification events (who classified, when classification properties were assigned, name of document etc) can be logged and reviewed by an administrator. Digital rights management policies such as Windows No Print or No Change can also be applied and controlled.

Figure 2:
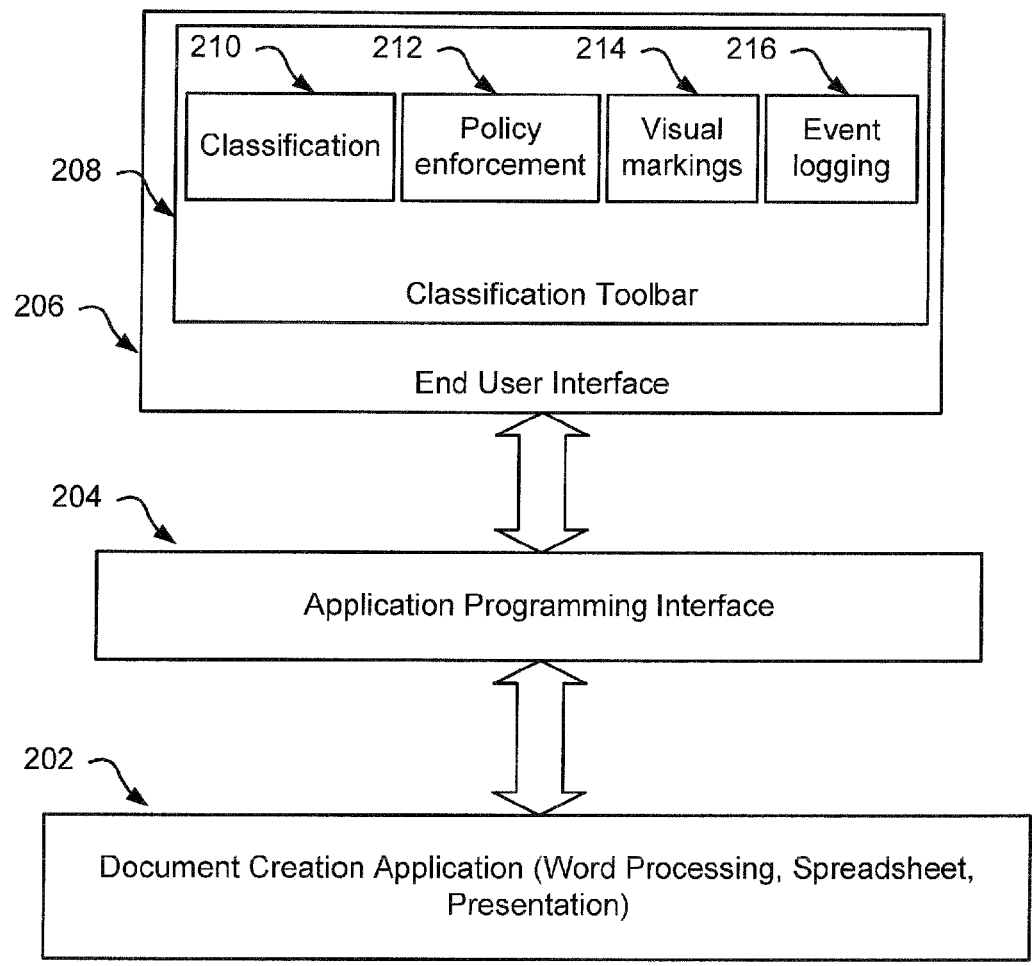
FIG. 2 shows a schematic representation of a high level client architecture for implementing a document classification toolbar.

FIG. 2 describes the high level client architecture for implementing document classification toolbar. In this example, applications such as Word, Excel, PowerPoint, Acrobat applications 202 are implemented in the computing environment. The development environment in this case is application programming interface (API) 204 such as Component Object Model (COM) programming interface utilized in Microsoft™ Office™ or APIs utilized in Adobe™. The end user interface 206 presents a composition screen or editing interface. The document classification is built by programming in the COM programming interface to accommodate a classification toolbar 208 presented to the user when composing a document. The toolbar may be implemented in a traditional toolbar approach or in the ribbon toolbar as provided in Microsoft Office 2007 applications. The classification toolbar 208 can be composed of several components, some presented to the user while others components provide additional functionality in regards to the classification process itself. For example, classification 210 selections may be presented to the user, as will be described in more detail. Classification policies 212 may be enforced based upon rules relative to the classification associated with the document, for example, certain classifications may limit who the has privileges to access, read, edit, save, print the document. Visual markings 214 may also be included in the document based on the classification, as will be discussed in more detail below, and events related to changes in classification may be logged 216 for access by an administrator.

Figure 3:
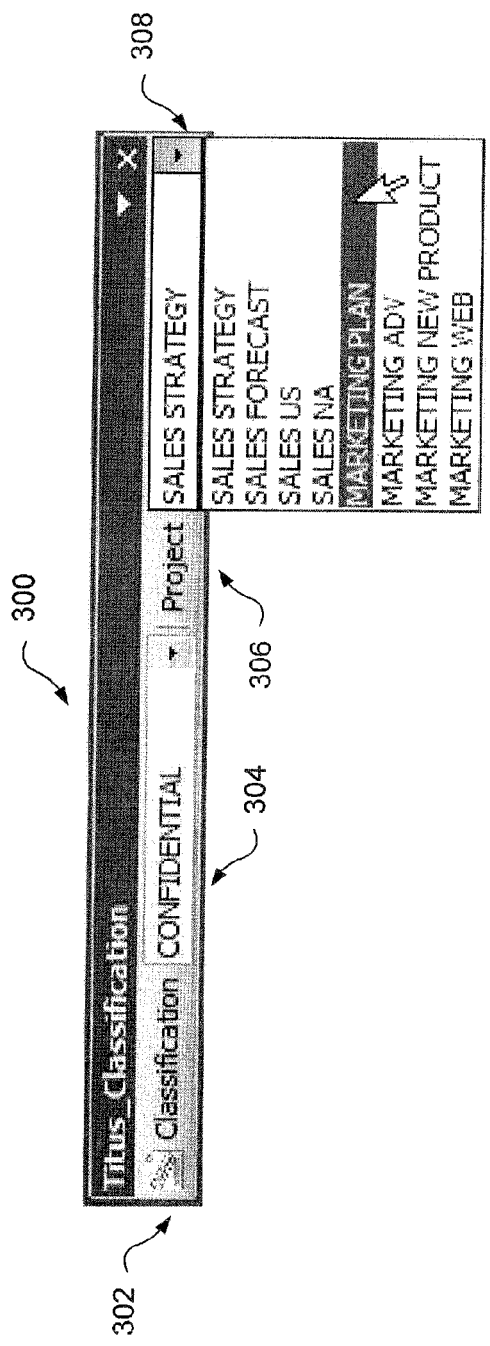
FIG. 3 shows a classification toolbar providing project classification.

FIG. 3 shows a document classification toolbar 300 utilized when creating or editing documents. By selecting classification criteria via the toolbar, users can assign visual markers to the document in addition to assigning classification properties. The classification toolbar 300 is added to the application in which the document is being edited to enable the user to select classifications to be associated with the document or portions of the document therein. In this example first level classification criteria entry menu 302 and a secondary classicisation criteria menu defining project 306 classifications are provided. In the classification menu 302, classifications criteria 304 such as for example a Sensitivity or Security level such as Unclassified, Confidential, Restricted, Internal Use Only, Secret, etc. can be selected by the user. Other levels of classification can be introduced such as secondary classification 306 to indicate the appropriate project 308 or department name such as Sales Strategy, Sales Forecast, Sales Plan, etc. or distribution such as Executive Only, Senior Managers only etc. and the like. Any type of classification category can be utilized including but not limited to project, case number, file number, patient number, customer number, program name or number, etc.

The collection of classification properties can be context sensitive and the selections are configurable. For example, if the user selects Confidential as the security classification, they could then be prompted for a retention property or a distribution property. On the other hand, if the user selects Unclassified as the document type, there would be no need to collect any other classification properties. As an example, the classification collection logic could be implemented as follows:

```
IF
    First Level Selection is CONFIDENTIAL
THEN
    DISPLAY Second Level RETENTION selection
ELSE
    NO MORE CLASSIFICATIONS
```

This example can be extended to many levels of classification allowing the organizations to collect many classification properties for each document. The toolbar is built dynamically based on the user selections. As an example of a possible configuration, if the user selected a sensitivity of PERSONAL, no other selections are necessary. If the user selects a sensitivity of COMPANY CONFIDENTIAL the toolbar is dynamically configured to further prompt the user for the allowed distribution of the document (e.g. LEGAL DEPT ONLY). In this way the toolbar can expand as the user is entering the classification information. Only subsequent classification criteria associated with the first selection is dynamically presented in the toolbar as will be discussed in connection with FIG. 14.

Figure 4:
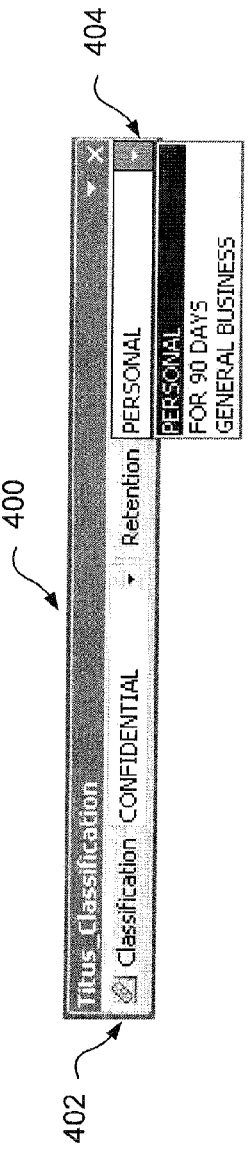
FIG. 4 shows a classification toolbar providing retention.

FIG. 4 shows classification toolbar 400 in which the first classification 402 is related to the security of the document while the second classification selection 404 defines the retention policy to be associated with the document. For example the document may have a retention-based model to classify the information to enforce retention with labels such as Personal, Retain for 90 days, Retain for 1 Year, or Corporate Correspondence. After classifications are assigned to the document, the document can be saved. Third party archiving and retention systems utilized the classification selection to determine if or how to retain a corporate document based on the Retention property assigned.

It should be understood that although on two classification criteria are shown each in FIGS. 3 and 4, a toolbar may present multiple classification criteria for selection by the user.

Figure 5:
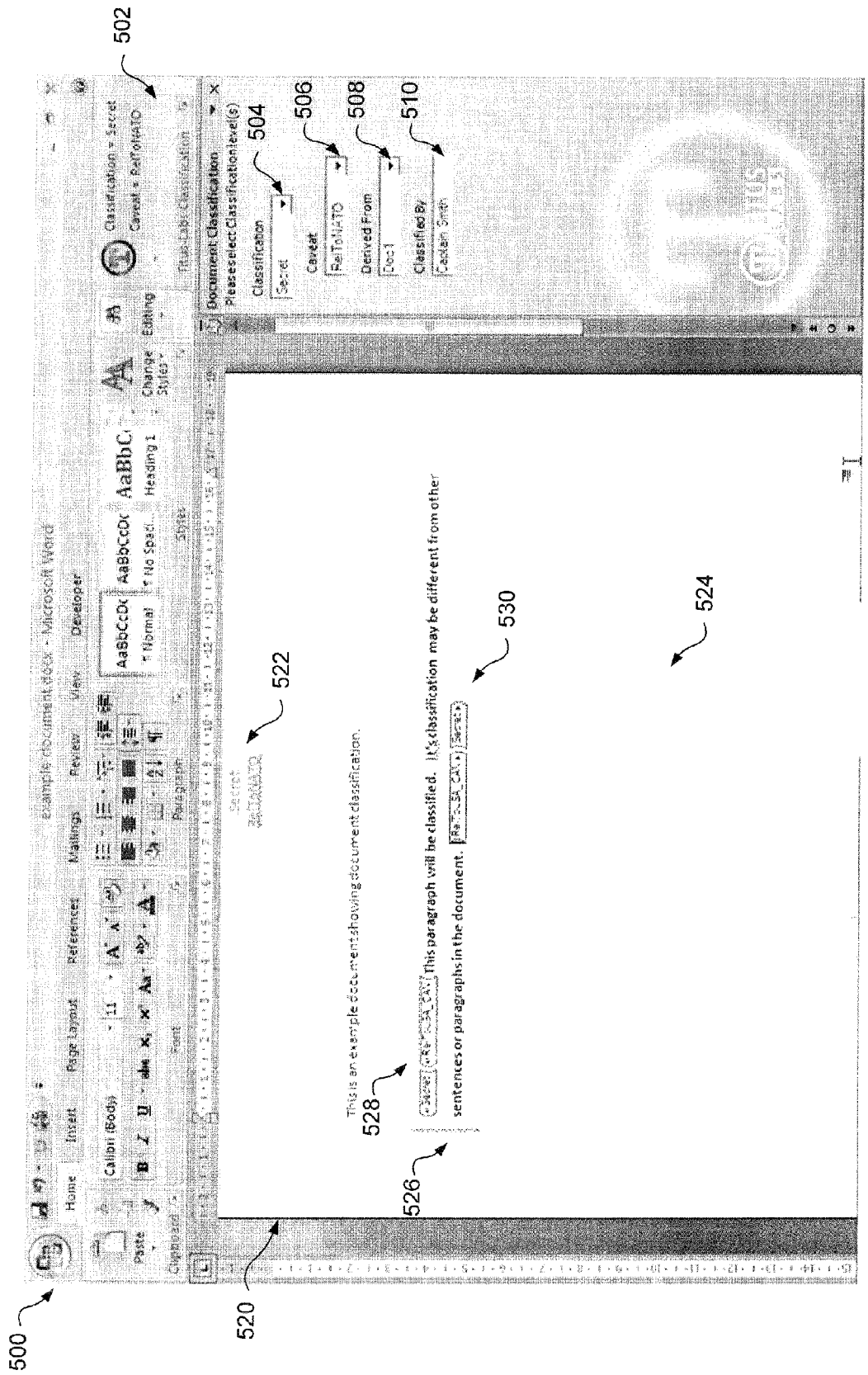
FIG. 5 shows document containing classification criteria.

FIG. 5 shows a word processing application 500, in this example Microsoft Word™ containing document 520 is shown utilizing a ribbon toolbar presentation. Toolbar 502 extends vertically within the application presenting the classification criteria to be selected by the user and applied to the document in contrast to the horizontal toolbar for FIGS. 3 & 4. The toolbar 502 presents a security classification criteria menu 504, a 'caveat' criteria menu 506, a 'derived' from menu 508 and an additional field 510 for entry of the classifying user. The classification criteria, as they are selected, can result in the application of visual cues to the text and images contained in the document 520. In this example, a header 522 is added which identifies the selected classification criteria. In addition, the classification scheme associated with the selected classification can add a watermark to the document 524, which in this example identifies the document as "SECRET". Automatic insertion of the author's user name in the document watermark can also be provided based upon the currently logged on user's name can be retrieved from the operating system and inserted into the document watermark.

Context sensitive text such as disclaimers can be added within the document body or within the header of footer portions. These disclaimers can be intelligently added to be tailored to the classification of the document and the associated content. For example, if UNCLASSIFIED was the selected classification the following text could be appended "This document is the property of XXX Corp. If you are not the intended recipient of the document please notify the originator", whereas a different postfix such as "This document has been marked as Confidential to XXX Corp. Unauthorized reproduction or transmission of the document is prohibited" if the classification selected was CONFIDENTIAL. Visual cues such as font characteristics can also be used in the added text for instance color, special fonts, font size, or formatting (table etc) can all be applied to text.

Portions of the document content may also be classified independently of the overall document, however when a portion classification is selected which is higher then the document selection, the document properties may be upgraded to match the selection, such as for example a security or sensitivity related criteria. In document 520, paragraph 526 is selected by the user for individual classification. By making selections using toolbar 502, visual cues 528 and 530 can be added within the document to clearly identify the associate classification criteria. In this example a classification of SECRET has been selected and a caveat RelToUSA_CAN which is not the same as the current selected document caveat RelToNATO. The classification markings for portions are represented within the document as Extensible Markup Language (XML) properties of the document as shown in FIG. 13. In the case or Microsoft Word, for example, the base XML version of the document is modified with custom classification properties which represent the classification portion markings and the overall document classification. The markings may be custom to the application or organization or may be defined as per the Intelligence Community Classification and Control Markings Manual also known as the CAPCO Guide.

High level functions are available to the user when composing a document through operation of the toolbar. These functions are also available if the user wants to apply classification information to an opened document that currently has no classification properties, or an opened document that already has assigned classifications. Classification selection can be forced on Save, Exit or Print from a pop-up dialog rather than presenting a classification toolbar. In addition a downgrade warning for preventing downgrades when Saving or Printing can also be provided. Although a word processing document is shown should be understood that the application of the classification criteria is equally applicable to any form of document, including but not limited to Microsoft Word™, Excel™ and PowerPoint™ formats. Any document creation product can be utilized which do not currently allow classification of documents.

Figure 6:
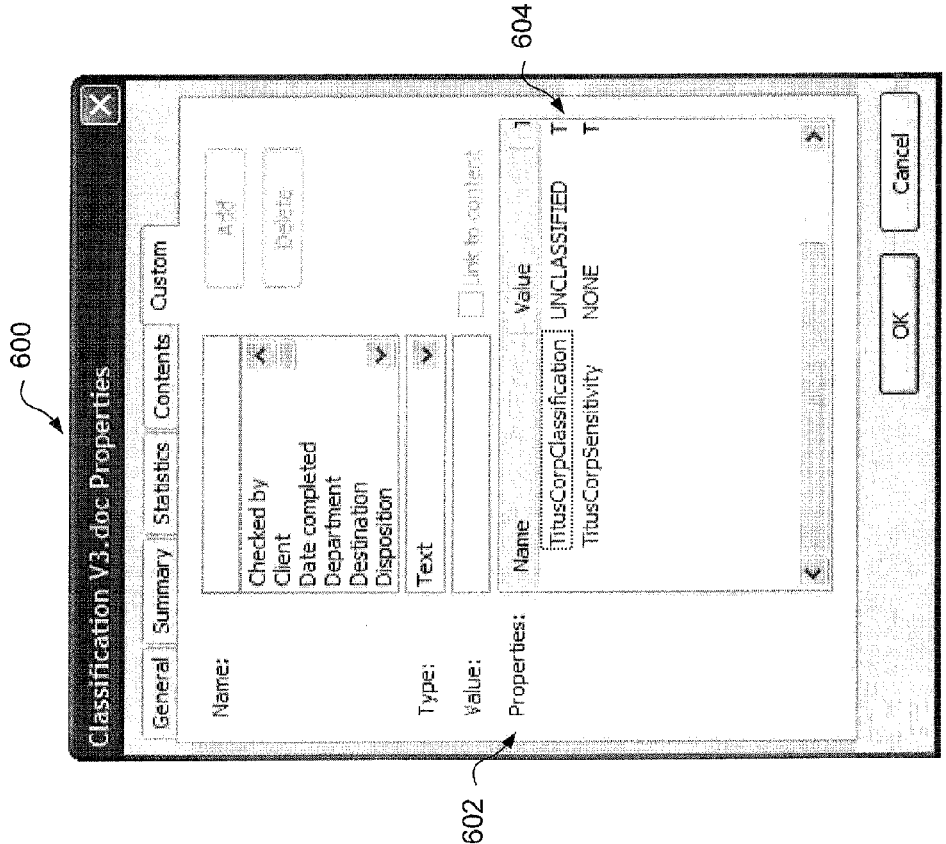
FIG. 6 shows document classification metadata properties.

FIG. 6 shows an example of document classification properties 600 inserted into document metadata. Document classification information can be added to documents generated by office productivity applications based on document-specific classification criteria properties. In this example under the document properties a custom label is created. The properties section 602 can define the classification criteria 604. Current document management systems do not modify the document in any way, as a result there are no visual markings in the document when it is opened in an application, that would identify the classification properties. Without visual markings the user has no easy way of identifying the classification of the document. The classification properties can be stored with the document properties provided in document metadata which may also be stored as XML properties in the document instead as Microsoft Office custom properties, as shown in FIG. 12. Trusted label support can also be utilized in generating the classification properties by providing verification that the classification of the document has not been modified (tampered with) since document was saved. This is accomplished by computing a hash based on document properties as the document is being saved, and then re-computing the hash for comparison when the document is re-opened. The Microsoft CAPI encryption algorithms can be used to generate a hash which is used to verify the authenticity of the classification properties when the document is opened.

Figure 7:
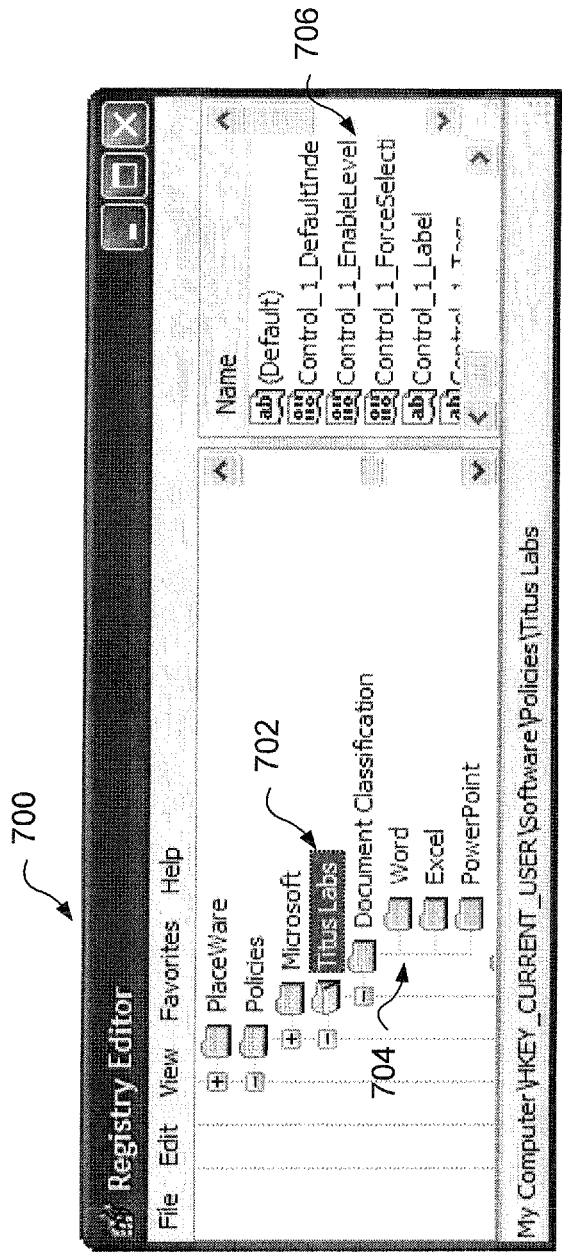
FIG. 7 shows a hierarchical tree in a Windows registry.

FIG. 7 presents a screen capture of an exemplary hierarchical tree in a Windows Registry 700. Each Microsoft Office™ product supports the insertion of header/footer objects differently. Microsoft Word allows the insertion of a header and a footer, in PowerPoint only footers are supported and in Excel header/footers are only visible on print. The registry entries 704 defined for each application enable an administrator to enter their requirements, but also result in a setup which is feasible for each product. The method used to implement this is a Windows registry tree which accommodates different settings for Word, Excel and PowerPoint. The entries 706 defines the behaviour of the toolbar within the application and how the classification criteria are applied to the document itself.

The classification toolbar can also provide built-in integration for users of the Microsoft Windows Rights Management Services (RMS) platform. Administrators can define associated RMS permissions such as Read, Full Control, Printing, Copy and Paste, and document expiration based on the classification label chosen. The RMS permissions or templates are defined within the Microsoft RMS Administration tool. Once these RMS permissions are defined they can be associated with classification criteria. This is done via Windows registry settings that indicate to the document classification toolbar if RMS protection should be automatically assigned based on a classification selection by the user. If RMS protection is to be applied, then another Windows registry would be used to indicate what protection should be assigned for each classification. As an example, a presentation assigned an HR ONLY label could be automatically assigned RMS permissions that would not allow anyone outside the HR department to view the presentation. The Document Classification Administration tool sets the correct Windows Registry settings based on the configuration selected by the administrator. These settings can then be applied to user desktops using scripts or Microsoft Group Policy.

Figure 8:
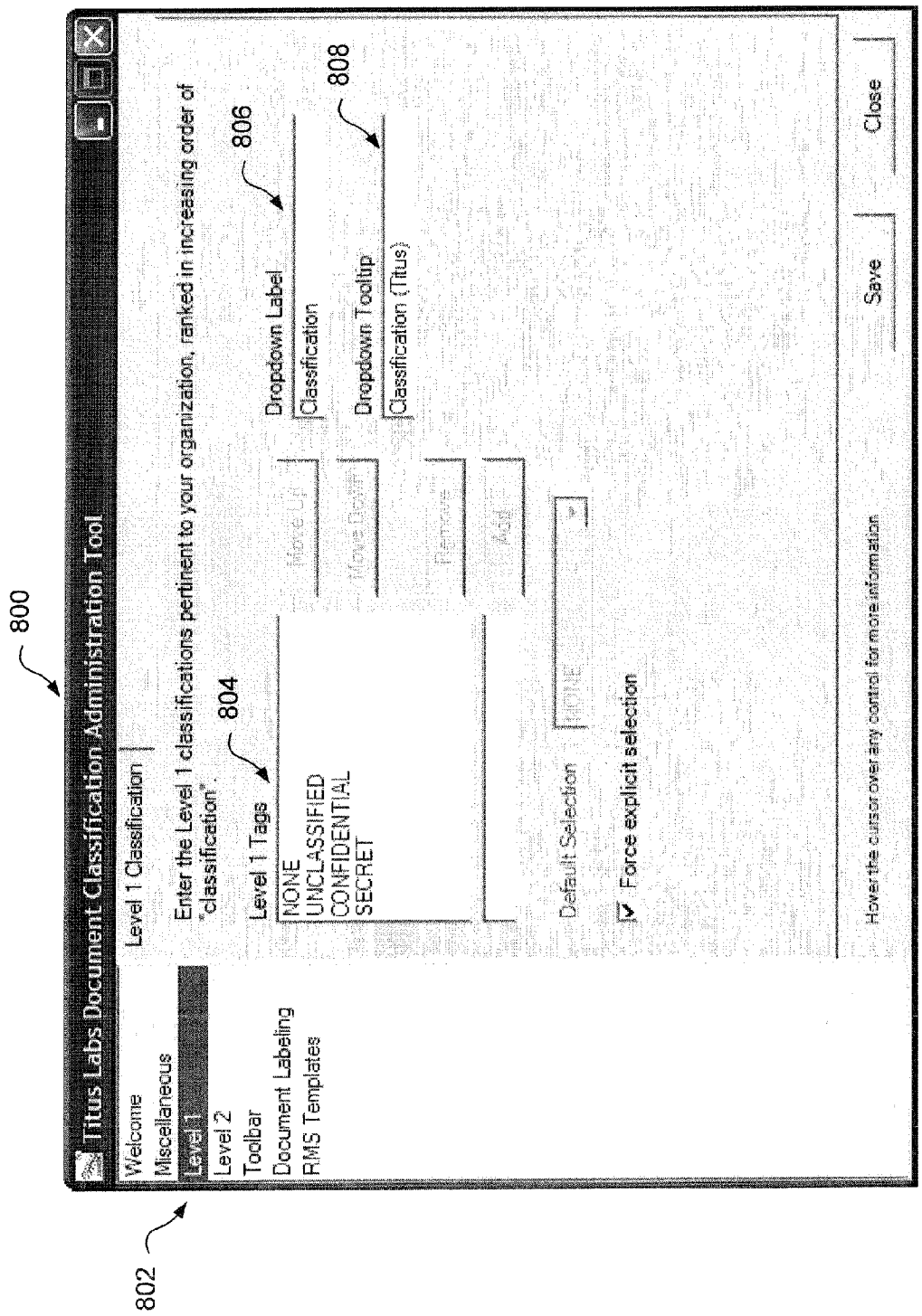
FIG. 8 shows a document classification administration tool.

FIG. 8 shows an classification administration tool window 800. The classification levels 802 of the toolbar are defined by selecting a specific level and associating criteria or tags 804 with the level. A toolbar label 806 can then be associated with the level in addition to a visual tooltip 808. Each level can be defined independently or be conditional on the previous level. Default selection can also be applied to enforce specific document attributes and visual markings. The administration tool also allows the administrator to predefine all possible classification selections and allows for automatic policy enforcement based on the classifications selected by the user. For instance the document could be automatically encrypted & protected using third party encryption schemes, such as digital rights management protection. Automatic logging of all classification actions by the user, which can be used to audit user compliance. The software can be configured to log all classification warnings, classification errors, or all classification events (who classified, when, classification properties assigned, name of document etc), The software writes this log information to the user's local Windows Event Log in a special folder. The administrator can perform the following actions: customize the list of labels you want to use; administrator can define default labels; define if/when the label(s) will appear in the presentation footer; define if/when the label(s) will appear in the presentation notes header/footer; force the user to make an explicit selection of a label before saving or printing the presentation; and turn on the trusted labels feature to ensure classification integrity.

Administrator defined settings are captured in the configuration file which is the central source of configuration information. The configuration file may be local on the computer 108, 110 and 112 or be provided by the document server 104. This enables customization of the list of labels for classification; ability for administrator to configure warnings or prevent users from downgrading classifications; ability for administrator configuration to apply different customized headers, footers and watermarks depending on the classification selected; administrator can define default labels; define if/when the label(s) will appear in the document title or file name; define the formatting and color of any visual marking text within the document such as the header or footer portions; define if/when the label(s) will appear including the ability to display abbreviations of the classifications; force the user to make an explicit selection of a label before saving; and sort and search a PC's or network's document database based on the document's classification.

Figure 9:
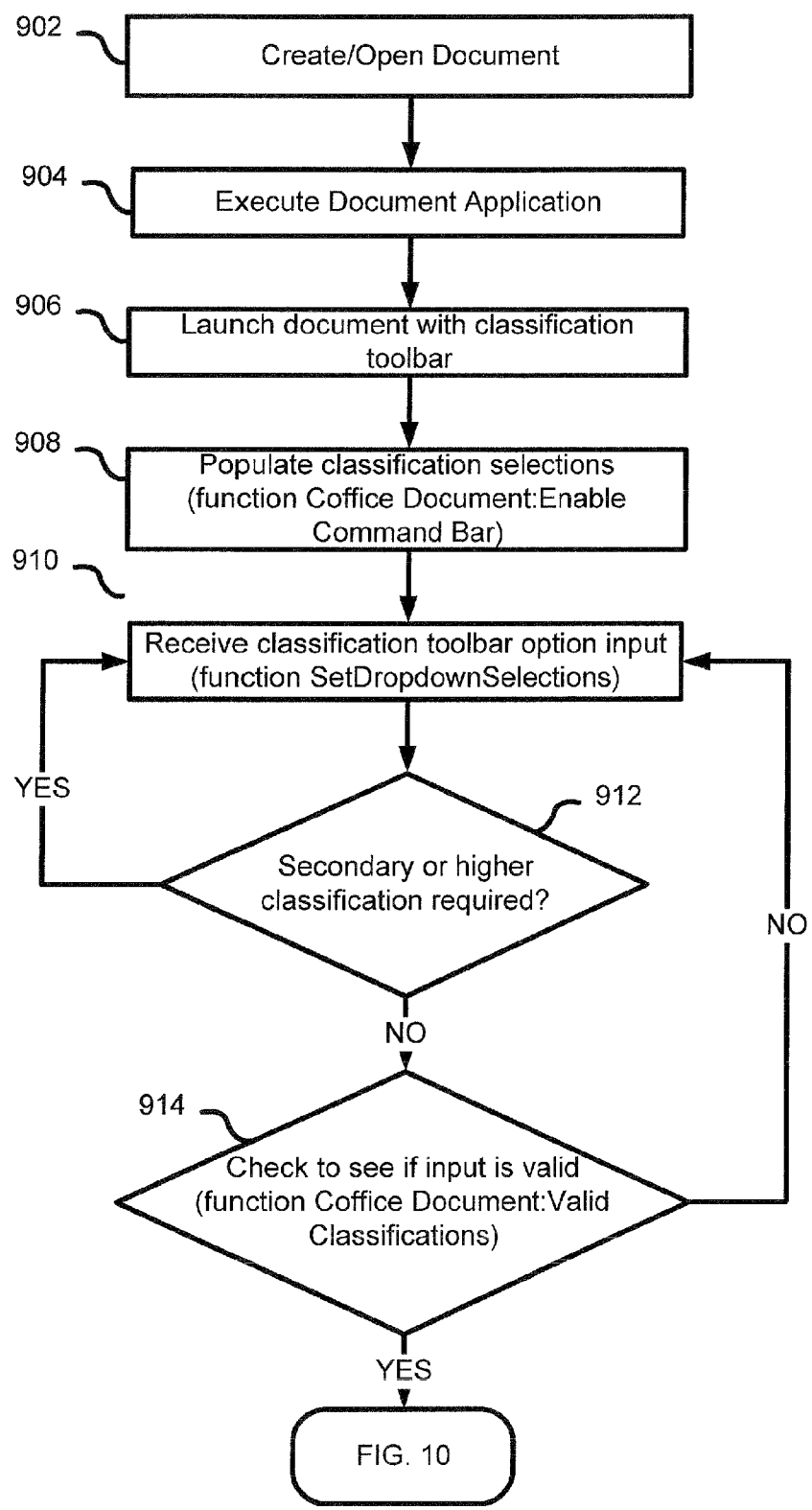
FIGS. 9 and 10 show a method for executing a classification toolbar and generating an document containing classification properties.
Figure 10:
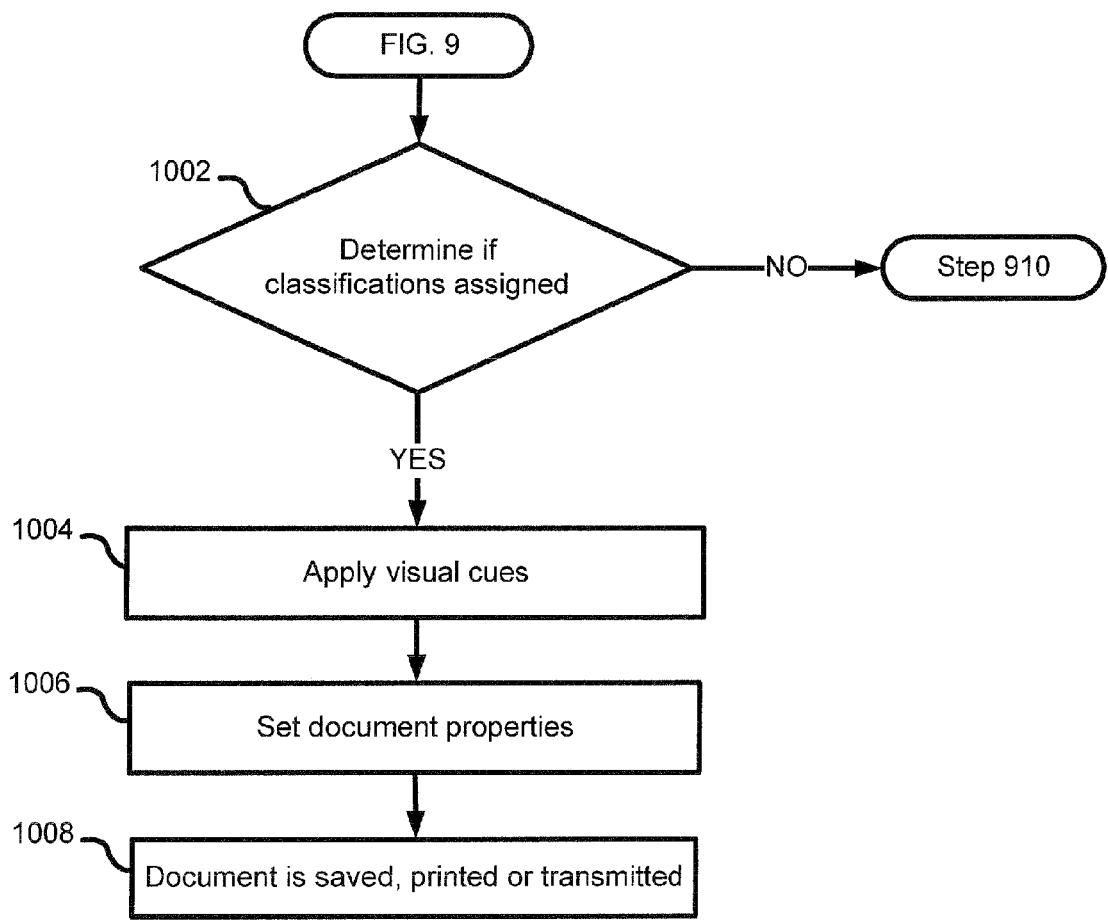

FIGS. 9 and 10 show a method for executing a classification toolbar and generating an document containing classification properties. At step 902 a user creates or opens a document using a productivity application. The document may be opened/created within an application or selected outside of the application in the operating system interface thus invoking the application to executed at step 904. At step 906 the classification toolbar is presented within the document. Based upon the defined administration policy of the classification the toolbar can then be populated with classification selection (for example function COffice Document:Enable Command Bar) at step 908. As previously noted the toolbar may alternatively only be presented at the end of the document creation process. The population criteria may be a default setting or may utilize existing classification settings previously associated with the document. The user can then select a first classification level at step 910 (for example function Set Dropdown Selection). If multiple classification level policies are implemented, YES at step 912, the next menu selection can then be made available at step 910. The selection of the next level of classification may be related to the previous level of classification selected, for example each selection in the first level may have a different subset of selections available in the second or subsequent levels. If no more classification levels are required, NO at step 912, the input is validated at step 914. Validation may be performed by the server or based upon rules contained within the client or done locally based on the administration policy. If the input is valid, YES at 914, as shown in FIG. 10, it is determined if classifications are assigned at step 1002. If no classification are assigned, NO at step 1002, step 910 is re-executed to require user input. If the classifications are assigned, YES at step 1002 the associated visual cues are added to the document at step 1004 and the document classification properties can be applied at step 1004. The document can then be saved, printed or transmitted with the classification.

Figure 11:
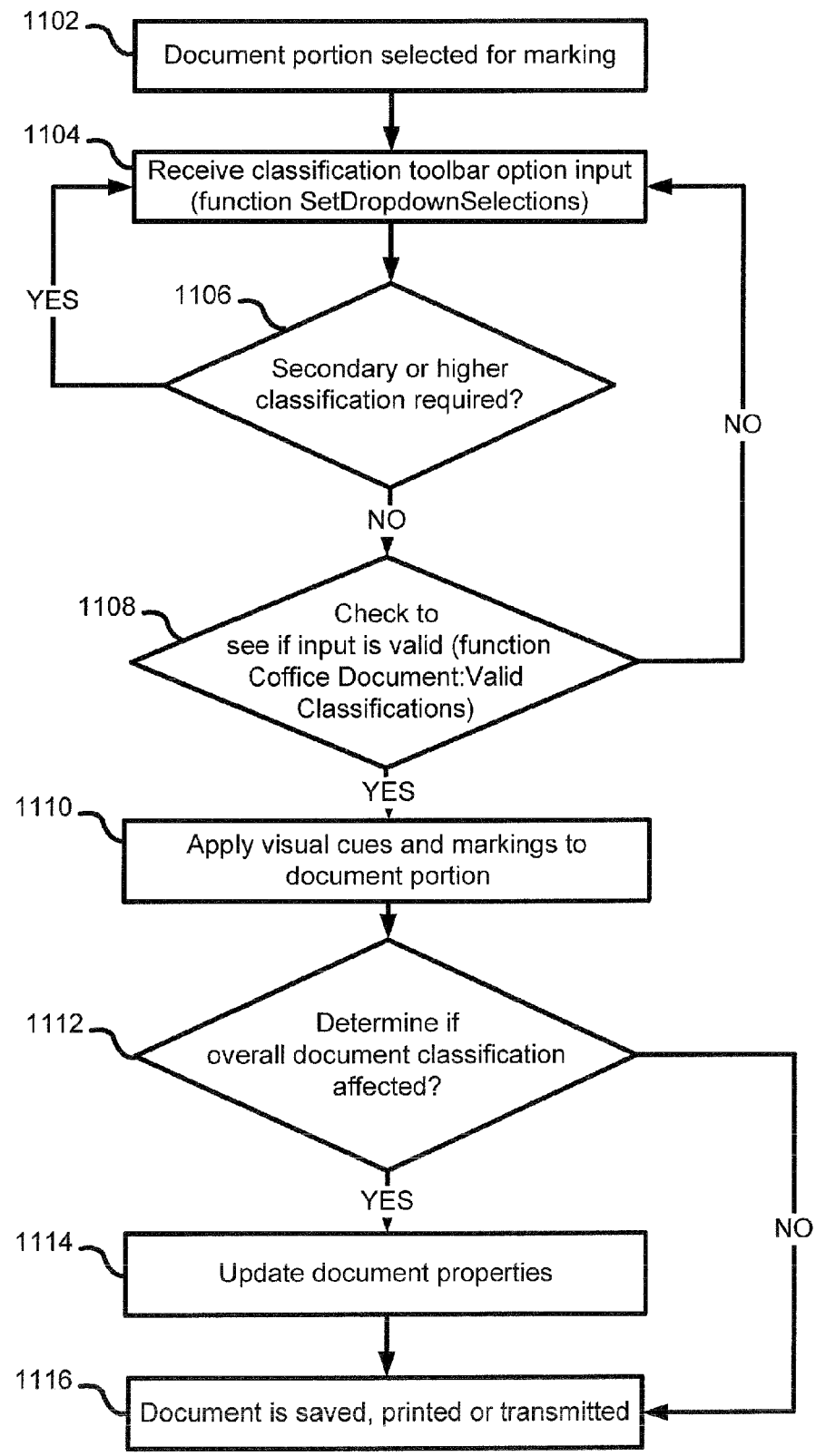
FIG. 11 shows a method for executing a classification toolbar for classification marking a portion of a document.

FIGS. 11 shows a method for executing a classification toolbar for classification marking a portion of a document. At step 1102 a user selects to classify a portion of document content, such as a sentence, paragraph, or an image for classification marking. It is assumed that the toolbar is already present, but it may be invoked if it is already not available. The population criteria may be a default setting or may utilize existing classification settings associated with the document, if previously defined. The user can then select a first classification level at step 1104 (for example function COffice Document:Enable Command Bar). If multiple classification level policies are implemented, YES at step 1106, the next menu selection can then be made available at step 1104. The selection of the next level of classification may be related to the previous level of classification selected, for example each selection in the first level may have a different subset of selections available in the second or subsequent levels. If no more classification levels are required, NO at step 1106, the input is validated at step 1108. Validation may be performed by the server or based upon rules contained within the client or done locally based on the administration policy. If the input is valid, YES at 1108, the associated visual cues and visual markings, such as specific graphics or icons, are added to the selection portion at step 1110. At this step XML properties representing the classification selections are written into the XML representation of the document. It is then determined if the selection impacts the overall document classification at step 1112. If the selected portion classification is higher than the document classification, then the document classification properties will also be updated to reflect the change, YES at step 1112. The document properties are then updated at step 1114. The document can then be saved, printed or transmitted at step 1116. If the classification does not impact the overall document classification, NO at step 1112, then the document can then be saved, printed or transmitted with the classification criteria at step 1116. At step 1114 the overall document visual cues of the document may also have to be updated if the classification criteria selected impact the overall document classification. For example, if the document was original UNCLASSIFIED and a portion of text was identified as SECRET, the overall document classification would be upgraded to SECRET.

FIG. 12 shows XML document classification properties 1200 as represented in XML in a Microsoft Word 2007 document. The classification properties are written to the custom properties file within the Microsoft Word 2007 Word XML representation (docx file). As an example, this document has a Caveat property (TitusCorpidCaveat) 1202 of ReltoNATO (Release to NATO). All of these classification properties are accessible to outside programs via normal XML programming tools.

FIG. 13 shows a portion of the document 1300 of FIG. 5 in XML and the identifying classification and portion marking. The portion classification markings are written to the document.xml file that is part of the XML representation of a Microsoft Word 2007 document (docx file). The custom XML inserted as a result of portion classification starts at the line that says CustomXML 1302. A custom XML schema representing the classification properties has been added to the base schema implemented by Microsoft for Word 2007 documents. In this example the user has classified the text "This paragraph will be classified" 1304. The text corresponds to what is currently in FIG. 5, section 526. Within this property you can see the actual text that has been portioned marked. The custom XML indicates that this portion has been classified as SECRET and ReItoUSA_CAN (Release to USA and Canada). Using XML to represent classification of portions means they are accessible to outside programs via normal XML programming tools. As an example it would be easy to write a document redaction tool which would redact a document based on the XML portion classifications.

Figure 14:
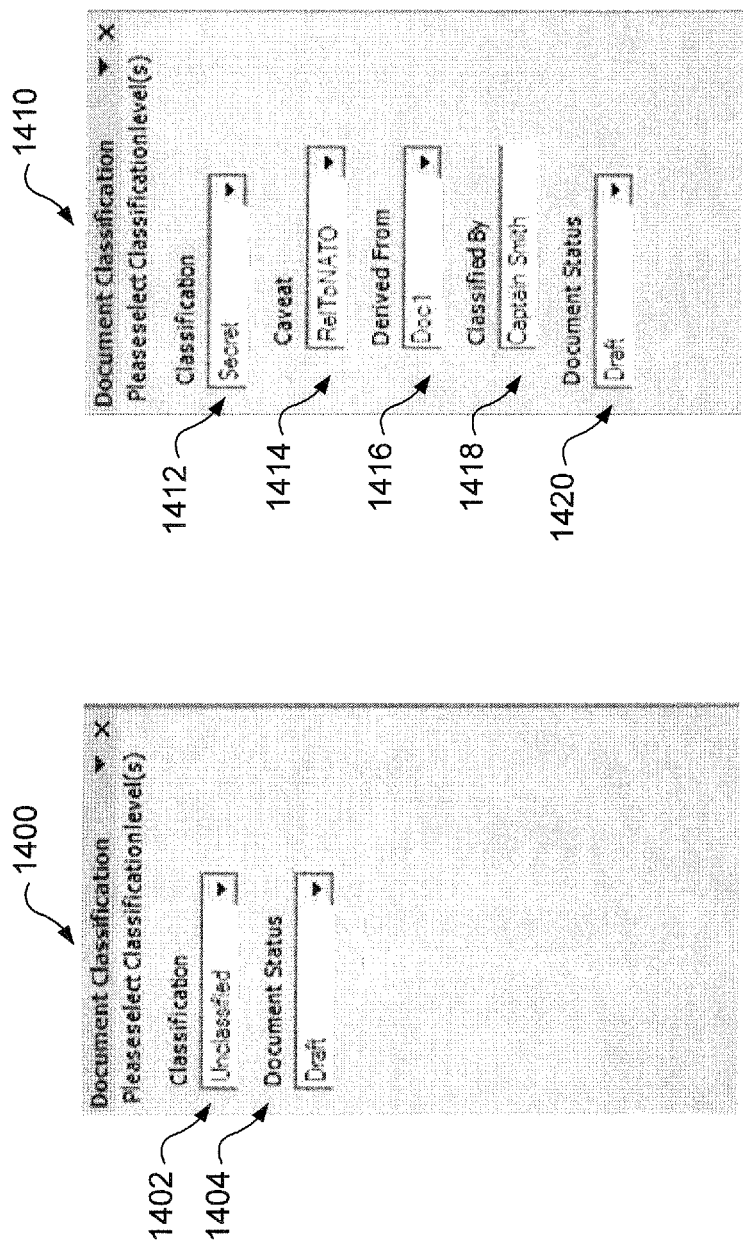
FIG. 14 shows an illustration of dynamic toolbar population.

FIG. 14 shows an illustration of dynamic toolbar population based on user classification selection. Toolbar 1400 shows a first classification selection 1402 of UNCLASSI- FIED. Based upon the selected classification the second classification criteria 1404 is populated with the criteria selection and entries associated with the first classification. In this example the UNCLASSIFIED selection results in the dynamic selection only one additional classification property of 'Document Status' and the associated entries. In contrast, in toolbar 1410, if the first classification criteria 1412 is selected to be SECRET, the three additional classification criteria are dynamically generated. The secondary classification criteria 1414 is a 'Caveat' selection property; third classification criteria 1416 in this case entitled 'Derived From'; and fourth classification criteria 1418 entitled 'Classified By'. In addition to independent field 1420 entitled document status, which may be tied back to the original SECRET classification and not dependent on the remaining classification selections. Each of the subsequent criteria may have dependent classification criteria that are dynamically generated based upon the user selections.

The following logic describes some example modules in the software and the methods associated with those modules. It also describes the events associated with each module. The COfficeDocument module contains the following methods:

i. AddHeaderFooter
ii. BuildPropertyString
iii. CalcDropdownWidths
iv. CheckDowngrade
v. Cleanup
vi. CreateCommandBar
vii. CreateHash
viii. EnableCommandBar
ix. EnableSecondLevel
x. ExtractFromSignature
xi. GetClassificationList
xii. GetDropdownSelections
xiii. GetProperty
xiv. GetSignatureShape
xv. HasClassifications
xvi. HashProperties
xvii. HasSignature
xviii. HasValidProperties
xix. HasValidPropertiesHashed
xx. Initialize
xxi. InsertFieldCode
xxii. InsertSignature
xxiii. InsertTitusTemplate
xxiv. Invoke
xxv. ProcessCommand
xxvi. ReadBuiltInProperty
xxvii. ReadSignature
xxviii. SelectClassifications
xxix. SetDropdownSelections
xxx. SetHeader
xxxi. SetRMSPermission
xxxii. SetWatermark
xxxiii. UpdateClassifications
xxxiv. UpdateHeaderFooter
xxxv. ValidClassifications
xxxvi. WriteClassifications The CClassificationList module contains the following methods:

xxxvii. ReadClassificationsFromDocument
xxxviii. WriteClassificationsToDocument
xxxix. WritePlaceholdersToDocument The CWordApplicationEventhandler module contains the following methods:

xl. AddOfficeDocument
xli. Cleanup
xlii. CleanupStrayDocuments
xliii. CreateHelpAbout
xliv. FindOfficeDocument
xlv. Initialize
xlvi. Invoke
xlvii. ProcessCommand The following provide more detail on the actual methods:

i. bool COfficeDocument::AddHeaderFooter(Word::RangePtr pRange, bool fInsert)
Summary: Adds text to a header/footer
Parameter pRange: Range to add too
Parameter fInsert: Can we insert into the document
Returns: Success of adding text
Determine if any of the fields in the range match the value for the first property or match the value for the second property
For all fields in range
If the value for the first property was not found and we can insert
Call InsertFieldCode
If the value for the second property was not found and we can insert
Call InsertFieldCode ii. std::string COfficeDocument::BuildPropertyString (Word::_DocumentPtr pDocument)
Summary: Combine statistics from document and classifications into one string
Parameter pDocument: Document to get properties from
Returns: String containing the properties iii. void COfficeDocument::CalcDropdownWidths( )
Summary: Calculate the width for each dropdown iv. bool COfficeDocument::CheckDowngrade( )
Summary: Determines if the classification level is okay in terms of downgrade
Returns: True if the save is allowed

---

If classification downgrade has occurred
    Show warn or prevent message to user
    If downgrading document is okay
        Prevent future warnings from displaying
        Return true
    Else
        Return false

--- v. void COfficeDocument::Cleanup( )
Summary: Cleanup the commandbar vi. void COfficeDocument::CreateCommandBar(bool fTampered)
Summary: Set up our custom toolbar
Parameter fTampered: Has the document been tampered with
Calls GetClassificationList
Adds a new toolbar
Adds the dropdowns to our toolbar
Calls EnableCommandBar
Calls GetDropdownSelections
Calls WriteClassifications vii. bool COfficeDocument::CreateHash(std::string strData, std::string& strHashedData)
Summary: Creates a hash of the data
Parameter strData: Data to hash
Parameter strHashedData: Hash of data
Returns: Hash creation success
Use the Crypt API to create a hash of the data viii. bool COfficeDocument::EnableCommandBar(bool fEnable)
Summary: Enable or disable our command bar
Parameter fEnable: Enable CommandBar
Returns: True if CommmandBar enabled
Calls SetDropdownSelections
Enables or Disables CommandBar
Calls EnableSecondLevel ix. void COfficeDocument::EnableSecondLevel(boot bFirstEnabled)
Summary: Enables second Level Dropdown
Parameter bFirstEnabled: Enabled second level x. std::string COfficeDocument::ExtractFromSignature (std::string strSignature, std::string strName)
Summary: Extracts a value of a name-value pair from the signature
Parameter strSignature: Signature to extract from
Parameter strName: Name of name-value pair to extract
Returns: Value of name-value pair to extract xi. CClassificationList* COfficeDocument::GetClassificationList(bool fTampered)
Summary: Returns the classification list
Parameter fTampered: Has the document been tampered with
Returns: Classification list

```
If we have previously set the classification list
    return that classification list
Else
    Create new classification list
    If document has not been tampered with
        Call ReadClassificationsFromDocument
    return the new classification list
``` xii. bool COfficeDocument::GetDropdownSelections( )
Summary: Retrieve the dropdown selections from the toolbar
Returns: If dropdown selection has changes since we last checked
Calls GetClassificationList
Get the selection for each dropdown xiii. STDMETHODIMP COfficeDocument::GetProperty (LPDISPATCH pDisp, LPOLESTR pszName, VARIANT* pvResult)
Summary: Retrieve a named property from the document
Parameter pDisp: Object to get property from
Parameter pszName: Name of property
Parameter pvResult: Value of property
Returns: Success xiv. Word::ShapePtr COfficeDocument::GetSignatureShape (Word::_DocumentPtr pDocument, bool fCreateNew)
Summary: Returns the signature shape that matches our signature name from the document
Parameter pDocument: Document to get signature shape from
Parameter fCreateNew: Create a new shape if requested
Returns: The signature shape
Match all shape names against our signature name

```
If a match is found
    return the match
Else
    If we can create a new shape
        Add a label to the document with the signature name
``` xv. bool COfficeDocument::HasClassifications (Word::_DocumentPtr pDocument)
Summary: Determines if the document has classifications
Parameter pDocument: Document to check
Returns: True if the document has classifications
Calls ReadClassificationsFromDocument xvi. bool COfficeDocument::HashProperties (Word::_DocumentPtr pDocument)
Summary: Creates a signature of the document properties
Parameter pDocument: Document to get properties from
Returns: Success of creating hash
Calls BuildPropertyString
Calls CreateHash
Calls InsertSignature xvii. bool COfficeDocument::HasSignature(Word::_DocumentPtr pDocument)
Summary: Determines if the document has a signature
Parameter pDocument: Document to check
Returns: True is document has a signature
Calls GetSignatureShape xviii. bool COfficeDocument::HasValidProperties (Word::_DocumentPtr pDocument)
Summary: Determine if the document has valid properties
Parameter pDocument: Document to check
Returns: True if valid Properties
Return False if we can't find all of our document properties xix. bool COfficeDocument::HasValidPropertiesHashed (Word::_DocumentPtr pDocument)
Summary: Determines if the hash in the signature matches the current document
Parameter pDocument: Document to check
Returns: True if signature matches properties of document
Calls ReadSignature on document
Calls ExtractFromSignature on the signature
Calls BuildPropertyString on document
Calls CreateHash
Compares hash from document and hash just created xx. void COfficeDocument::Initialize(LPDISPATCH/*lpDispatch*/)
Summary: Get the handle to the window for the document
Parameter lpDispatch: unused xxi. bool COfficeDocument::InsertFieldCode(Word::FieldPtr pField, LPCSTR szName)
Summary: Insert a new field code using the given property name
Parameter pField: Field to insert into
Parameter szName: Name of document property
Returns: Success of insertion xxii. void COfficeDocument::InsertSignature (Word::_DocumentPtr pDocument, std::string strValue)
Summary: Inserts the text into the signature shape
Parameter pDocument: Document to insert signature into
Parameter strValue: Value to put in signature
Calls GetSignatureShape
Sets the text of the signature shape xxiii. bool COfficeDocument::InsertTitusTemplate( )
Summary: Insert a Word template into the document
Returns: True if template inserted
Open a named word template file (.dot)
Copy the contents of the template document into the current document xxiv. STDMETHODIMP COfficeDocument:: Invoke (DISPID displdMember, REFIID riid, LCID lcid, WORD wFlags, DISPPARAMS* pDispParams, VARIANT* pVarResult, EXCEPINFO* pExcepl nfo, UINT* puArgErr)
Summary: Event handler for COfficeDocument
Parameter displdMember: Event type Parameter riid: Interface type
Parameter lcid: unused
Parameter wFlags: unused
Parameter pDispParams: unused
Parameter pVarResult: unused
Parameter pExcepInfo: unused
Parameter puArgErr: unused
Returns: Success
New Event:
Set Active to true
Set Active Window to current document
Open Event:
Set Active to true
Set Active Window to current document
Close Event:
Set Active to false
Unset Active Window to current document
xxv. HRESULT COfficeDocument::ProcessCommand(int nControlID, int nCommand, bool fMakeDirty)
Summary: Process commands sent from the toolbar
Parameter nControlID: What control is sending the command
Parameter nCommand: unused
Parameter fMakeDirty: unused
Returns: Success

```
If Control is first level dropdown
    Calls GetDropdownSelections
    Calls EnableSecondLevel
    Calls WriteClassifications
Else If Control is second level dropdown
    Calls GetDropdownSelections
    Calls WriteClassifications
Else if Control is third level button
    Calls SelectClassifications
    Calls WriteClassifications
``` xxvi. std::string COfficeDocument::ReadBuiltInProperty (Word::_DocumentPtr pDocument, std::string strPropertyName)
Summary: Return a string for the named built in property
Parameter pDocument: Document to read from
Parameter strPropertyName: Name of property to read
Returns: Value of property
xxvii. std::string COfficeDocument::ReadSignature (Word::_DocumentPtr pDocument)
Summary: Gets the text from the signature shape
Parameter pDocument: Document to read from
Returns: Text of signature
Calls GetSignatureShape\
xxviii. bool COfficeDocument::SelectClassifications( )
Summary: Shows Select Classification Dialog
Returns: Classifications set from dialog
Calls GetClassificationList
Shows Select Classifications Dialog <<Screenshot of dialog>>
xxix. void COfficeDocument::SetDropdownSelections( )
Summary: Set the selections on each dropdown
Calls GetClassificationList
Set the selection for each dropdown
xxx. void COfficeDocument::SetHeader(bool fInsert)
Summary: Updates or inserts text in all headers and footers
Parameter fInsert: Are we allowed to insert text into the header if it doesn't exist already
For all sections of the document
Calls UpdateHeaderFooter on the PrimaryHeaderRange
Calls UpdateHeaderFooter on the FirstPageHeaderRange
Calls UpdateHeaderFooter on the EvenPageHeaderRange
Calls UpdateHeaderFooter on the PrimaryFooterRange
Calls UpdateHeaderFooter on the FirstPageFooterRange
Calls UpdateHeaderFooter on the EvenPageFooterRange
If we can insert
    If header required
        Calls AddHeaderFooter on the PrimaryHeaderRange
        Calls AddHeaderFooter on the FirstPageHeaderRange
        Calls AddHeaderFooter on the EvenPageHeaderRange
    If footer required
        Calls AddHeaderFooter on the PrimaryFooterRange
        Calls AddHeaderFooter on the FirstPageFooterRange
        Calls AddHeaderFooter on the EvenPageFooterRange
xxxi. bool COfficeDocument::SetRMSPermission( )
Summary: Sets the RMS template to be applied to the document
Returns: Success
Get the RMS template assosiated with the current classification
Calls GetProperty passing in "Permission"
Retrieves current RMS template applied

```
If RMS is required
    Enable RMS
    Apply RMS template
Else
    If RMS is on
        Remove RMS
    If RMS failed
        Show RMS failure warn or prevent message
``` xxxii. void COfficeDocument::SetWatermark(std::string strClassification, bool fInsert)
Summary: Updates or inserts the watermark using the given classification
Parameter strClassification: Text to put as the watermark
Parameter fInsert: Are we allowed to insert a watermark if one isn't there
If the Titus watermark is found by matching the name of the watermark against a known name

```
    If we require a watermark
        Update the text of the watermark to reflect the current classification
    Else
        Delete the watermark from the document
Else
    If we require a watermark
        Insert the watermark into the document with the text set to the current classification
``` xxxiii. void COfficeDocument::UpdateClassifications (bool fTampered)
Summary: Updates the header, footer, watermark, and selected fields within the document
Parameter fTampered: Has the document been tampered with
If the document has not been tampered with
Call SetWatermark
Call SetHeader
Update fields in the document that match our property names
xxxiv. bool COfficeDocument::UpdateHeaderFooter (Word::RangePtr& pRange, bool fInsert)

Summary: Update a header/footer
Parameter pRange: Range of a header/footer
Parameter fInsert: False to hide the text
Returns: True if update successful
For all fields in the range of the document
If the field code text matches the value for the first property
  Change the hidden value and update it
If the field code text matches the value for the second property
  Change the hidden value and update it
xxxv. bool COfficeDocument::ValidClassifications( )
Summary: Determines if all dropdowns that require a selection have been set
Returns: True if no dropdown requires a selection
xxxvi. bool COfficeDocument::WriteClassifications(bool fAskIfRequired, bool fTampered)
Summary Writes classifications to document
Parameter fAskIfRequired: Ask for classifications if they are not valid
Parameter fTampered: Has the document been tampered with
Returns: True if classifications are valid
Calls GetClassificationList
Calls ValidClassifications
If ForceSelect is on and classifications are not valid
Calls SelectClassifications
Calls ValidClassifications
If the classifications are valid
Calls WriteClassificationsToDocument
Calls UpdateClassifications
xxxvii. short CClassificationList::ReadClassificationsFromDocument (Word::_DocumentPtr pDocument)
Summary: Reads the classifications from the document
Parameter pDocument: Document to read classifications from
Returns: Number of levels
Get the custom document properties from the document
Get the value from the named property for the first level
Get the value from the named property for the second level
Get the value from the named property for the third level
xxxviii.short CClassificationList::WriteClassificationsToDocument (COfficeDocument* pDocument)
Summary: Writes classifications into the custom document properties
Parameter pDocument: Document to write classification to
Returns: Zero
Gets the custom document properties
Adds or updates the value of the custom document property with the value of the first dropdown
Adds or updates the value of the custom document property with the value of the second dropdown
Adds or updates the value of the custom document property with the value of the third level
xxxix. short CClassificationList::WritePlaceholdersToDocument (COfficeDocument* pDocument)
Summary: Write classifications to document properties
Parameter pDocument: Document to write to
Returns: Zero
Add a custom document property for the first level
Add a custom document property for the second level
Add a custom document property for the third level
xl. COfficeDocument* CWordApplicationEventHandler::AddOfficeDocument (Word::_DocumentPtr pDocument, bool fNew, bool fIsE-mail)
Summary: Add the word document to our collection
Parameter pDocument: Document to add
Parameter fNew: Is the document new
Parameter fIsE-mail: Is the document an e-mail
Returns: COfficeDocument
Calls FindOfficeDocument
If that returns NULL
Calls HasClassifications
Calls HasValidPropertiesHashed
If those two calls return true
  Calls HasSignature
  If that call returns true
    Set tampered to true
  Create a new COfficeDocument
  Calls CreateCommandBar
  If tampered
    Show Invalid Signature message
  If new document and not an e-mail
    Calls InsertTitusTemplate
xli. void CWordApplicationEventHandler::Cleanup( )
Summary: Cleanup help command bar
xlii. void CWordApplicationEventHandler::CleanupStrayDocuments( )
Summary: Remove any documents from our collection that we don't need anymore
xliii. void CWordApplicationEventHandler::CreateHelpAbout( )
Summary: Add a menu item to the Help About menu
If the menu item is already there delete it
Add the menu item
xliv. COfficeDocument* CWordApplicationEventHandler::FindOfficeDocument (Word::_DocumentPtr pDocument)
Summary: Find the document in our collection
Parameter pDocument: Document to find
Returns: Document in our collection
Match the document in our collection with the one passed in If matched
  return that document
Else
  return null xlv. void CWordApplicationEventHandler::initialize(LPDISPATCH /*lpDispatch*/)
Summary: Initialize event handler
Parameter lpDispatch: unused
Calls CreateHelpAbout
xlvi. STDMETHODIMP CWordApplicationEventHandler::Invoke(DISPID dispIdMember, REFIID riid, LCID Icid, WORD wFlags, DISPPARAMS* pDispParams, VARIANT* pVarResult, EXCEPINFO* pExcepInfo, UINT* puArgErr)
Summary: Event handler for CWordApplicationEventHandler
Parameter dispIdMember: Event type
Parameter riid: Interface type
Parameter Icid: Unused
Parameter wFlags: Unused
Parameter pDispParams: Parameters for event
Parameter pVarResult: Unused
Parameter pExcepinfo: Unused
Parameter puArgErr: Unused
Returns: Success
Quit Event:
Calls CleanupStrayDocuments DocumentBeforePrint Event:
Calls WriteClassifications
Cancel print if classifications are not okay
DocumentBeforeSave Event:
If document is dirty and this is not an auto-save
   Calls WriteClassifications on Document
   Calls CheckDowngrade on Document
   Calls SetRMSPermission on Document
   Calls HashProperties on Document
   If any of these methods return false
     Cancel the Save
WindowActivate Event:
Calls FindOfficeDocument
If document not in collection
   Calls AddOfficeDocument
Calls EnableCommandBar
Calls ShowCommandBar
Calls CleanupStrayDocuments
WindowDeactivate Event:
Calls FindOfficeDocument
Calls CleanupStrayDocuments
   xlvii. HRESULT CWordApplicationEventHandler::ProcessCommand(int nControlID, int nCommand, bool fMakeDirty)
   Summary: Show the about dialog
   Parameter nControlID: ID of control
   Parameter nCommand: unused
   Parameter fMakeDirty: unused
   Returns: Success
   Show About Dialog It will be apparent to persons skilled in the art that many alternatives, modifications, and variations can be made without departing from the scope as defined in the claims. The method steps described may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

A computing environment for executing the document creation application and the classification toolbar may be implemented as computer software in the form of computer readable code executed. The computing environment may be any number of computing or computer based platforms such as mobile devices, personal computer, notebook computers, or personal digital assistants. The computer comprises central processing unit (CPU) and memory. The CPU may be a single processor or multiprocessor system. In various computing environments, main memory and storage can reside wholly on computer environment, or they may be distributed between multiple computers.

Input devices such as a keyboard and mouse may be coupled to a bi-directional system bus of a computer for receiving input for creating documents within the web client. The keyboard and mouse are for introducing user input to a computer and communicating that user input to processor if required. Computer may also include a communication interface. Communication interface provides a two-way data communication coupling via a network link to a network by wired or wireless connection or may provide an interface to other host devices by a direct radio frequency connection. In any such implementation, communication interface sends and receives electrical, electromagnetic or optical signals which carry digital data streams representing various types of information. Communication between the communication interface unit and the network or host use electrical, electromagnetic or optical signals which carry digital data streams. The signals through the various networks and the signals on network link and through communication interface, which carry the digital data to and from computer, are exemplary forms of carrier waves transporting the information.

The computer processor or similar device may be programmed in the manner of method steps, or may be executed by an electronic system which is provided with means for executing these steps. The storage device may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing these method steps may also be transmitted via a communication network.

The embodiments described above are intended to be illustrative only. The scope of the invention is therefore intended to be limited solely by the scope of the appended claims.

The invention claimed is:

1. A method for document classification in a document creation application comprising:
   providing a security classification toolbar incorporated within an extendable mark-up language (XML) based word processing document of the document creation application, the classification toolbar providing a security classification selection input;
   populating the security classification selection input in the classification toolbar with a plurality of security classification selections based upon pre-defined security classification criteria, the pre-defined security classification criteria defining the plurality of security classification selections available to a user of the document creation application for applying classification to the word processing document;
   receiving a security classification selection input from the plurality of security classification selections, selected by the user, from the security classification selections populated in the toolbar;
   applying visual markings associated with the selected security classification input, the visual markings inserted within editable text portions in a body, a header or a footer of the XML based word processing document in the document creation application, the visual markings to provide visual identification within the editable text portion of the XML based word processing document that the XML based word processing document has been security classified when the security classification has been selected; and
   assigning XML security classification properties associated with the selected security classification input in document metadata embedded in the XML based word processing document identifying the selected security classification input.

2. The method of claim 1 wherein the XML security classification properties are defined within a custom XML schema representing classification properties added to a base schema of the XML based word processing document.

3. The method of claim 2 further comprising:
   determining if an additional security classification is required based upon the security classification input; and
   dynamically changing the toolbar in order to prompt for additional security classification selection input, selected by the user, from the toolbar.

4. The method of claim 3 further comprising:
receiving identification of a selected portion of text comprising subset of text in the XML based word processing document selected by the user;
receiving the security classification input from the classification selections populated in the toolbar in connection with the selected portion of text;
determining if the security classification input is valid based upon administrator defined classification policy;
applying security classification visual markings associated with the selected security classification to the selected portion of text when the classification input is valid; and
applying XML properties within the XML based word processing document representing security classification of the selected portion of text.

5. The method of claim 3 further comprising applying encryption to the XML based word processing document based on a selected additional security classification input.

6. The method of claim 4 wherein the pre-defined criteria are defined relative to one or more security levels, sensitivity levels, intended distribution groups or retention level.

7. The method of claim 4 further comprising:
comparing security classifications of the selected portion of text to current document security classifications; and
updating security classification properties of document metadata when the security classification of the selected portion of text are higher than current document security classification.

8. The method of claim 7 wherein portions of text of the XML based word processing document may have a lower security classification than the document security classification, the portions of text being identified with portion marking.

9. The method of claim 6 wherein the visual markings in the body of the XML based word processing document is a watermark.

10. The method of claim 1 wherein populating the security classification selection input comprises retrieving classification properties previously associated with the XML based word processing document and populating the security classification selection input based upon the retrieved classification properties.

11. The method of claim 1 further comprising verifying that the XML security classification properties in the document metadata has not been tampered by calculating a hash of document properties when the XML based word processing document is saved and subsequently comparing the hash on retrieval and opening of the XML based word processing document.

12. The method of claim 11 wherein the hash is determined by applying an encryption algorithm to the XML based word processing document.

13. The method of claim 1 wherein the classification toolbar is generated by a COM API interface.

14. The method of claim 1 wherein the toolbar is provided by a Microsoft Office™ ribbon bar or task pane.

15. The method of claim 1 further comprising applying encryption to the XML based word processing document based on the selected security classification input.

16. The method of claim 1 wherein the word processing document is an e-mail application.

17. The method of claim 1 wherein the plurality of security classification selections available to the user are determined by rights management service platform (RMS).

18. The method of claim 1 wherein the visual markings applied to the document are determined by determined by rights management service platform (RMS) based upon the received security classification selection input.

19. The method of claim 1 the plurality of security classification selections available to be selected by the user are based upon a user profile.

20. The method of claims 1 wherein the received security classification selection input is validated against a defined administration policy before application of the visual markings, wherein the visual markings are not applied if the selection security classification input does not comply with the defined administration policy for the document or user.

21. A non-transitory computer readable medium containing instructions for providing document classification in a document creation application, the instructions which when executed by a processor for performing:
providing a security classification toolbar incorporated within an extendable mark-up language (XML) based word processing document of the document creation application, the classification toolbar providing a security classification selection input;
populating the security classification selection input in the classification toolbar with a plurality of security classification selections based upon pre-defined security classification criteria, the pre-defined security classification criteria defining the plurality of security classification selections available to a user of the document creation application for applying classification to the word processing document;
receiving a security classification selection input from the plurality of security classification selections, selected by the user, from the security classification selections populated in the toolbar;
applying visual markings associated with the selected security classification input, the visual markings inserted within editable text portions in a body, a header or a footer of the XML based word processing document in the document creation application, the visual markings to provide visual identification within the editable text portion of the XML based word processing document that the XML based word processing document has been security classified based when the security classification has been selected; and
assigning XML security classification properties associated with the selected security classification input in document metadata embedded in the XML based word processing document identifying the selected security classification input.

22. The non-transitory computer readable medium of claim 21 wherein the XML security classification properties are defined within a custom XML schema representing classification properties added to a base schema of the XML based word processing document.

23. The non-transitory computer readable medium of claim 22 further comprising:
determining if an additional security classification is required based upon the security classification input; and
dynamically changing the toolbar in order to prompt for additional security classification selection input, selected by the user, from the toolbar.

24. The non-transitory computer readable medium of claim 23 wherein the instructions further comprising applying encryption to the XML based word processing document based on a selected additional security classification input.

25. The non-transitory computer readable medium of claim 23 further comprising:
   receiving identification of a selected portion of text comprising subset of text in the XML based word processing document selected by the user;
   receiving the security classification input from the classification selections populated in the toolbar in connection with the selected portion of text;
   determining if the security classification input is valid based upon administrator defined classification policy;
   applying security classification visual markings associated with the selected security classification to the selected portion of text when the classification input is valid; and
   applying XML properties within the XML based word processing document representing security classification of the selected portion of text.

26. The non-transitory computer readable medium of claim 25 further comprising:
   comparing security classifications of the selected portion of text to current document security classifications; and
   updating security classification properties of document metadata when the security classification of the selected portion of text is higher than current document security classification.

27. The non-transitory computer readable medium of claim 25 wherein portions of text of the XML based word processing document may have a lower security classification than assigned XML security classification properties of document metadata, the portions of text being identified with portion marking.

28. The non-transitory computer readable medium of claim 26 further comprising denying the security classification of the selected portion of text if the security classification of the portion of text is lower than the current document security classification.

29. The non-transitory computer readable medium of claim 21 wherein the visual markings in the body of the XML based word processing document is a watermark.

30. The non-transitory computer readable medium of claim 21 wherein populating the security classification selection input comprises retrieving classification properties previously associated with the XML based word processing document and populating the security classification selection input based upon the retrieved classification properties.

31. The non-transitory computer readable medium of claim 21 further comprising verifying that the XML security classification properties in the document metadata have not been tampered by calculating a hash of document properties when the XML based word processing document is saved and subsequently comparing the hash on retrieval and opening of the XML based word processing document.

32. The non-transitory computer readable medium of claim 31 wherein the hash is determined by applying an encryption algorithm to the XML based word processing document.

33. The non-transitory computer readable medium of claim 21 wherein the instructions further comprising applying encryption to the XML based word processing document based on the selected security classification input.

34. The non-transitory computer readable medium of claims 21 wherein the word processing document is an e-mail application.

35. non-transitory computer readable medium of claims 21 wherein the plurality of security classification selections available to a user are determined by rights management service platform (RMS).

36. The non-transitory computer readable medium of claims 21 wherein the visual markings applied to the document are determined by determined by rights management service platform (RMS) based upon the received security classification selection input.

37. The non-transitory computer readable medium of claims 21 wherein the plurality of security classification selections available to be selected by the user are based upon a user profile.

38. The non-transitory computer readable medium of claims 21 wherein the received security classification selection input is validated against a defined administration policy before application of the visual markings, wherein the visual markings are not applied if the selection security classification input does not comply with the defined administration policy for the document or user.

* * * * *